United States Patent
Rajkotia et al.

(10) Patent No.: US 7,512,403 B2
(45) Date of Patent: *Mar. 31, 2009

(54) APPARATUS AND METHOD FOR PERFORMING AN INTERFREQUENCY HANDOFF IN A WIRELESS NETWORK

(75) Inventors: Purva R. Rajkotia, Plano, TX (US); Sanjay Kumar Kodali, Dallas, TX (US); Joseph R. Cleveland, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

This patent is subject to a terminal disclaimer.

(21) Appl. No.: 10/325,649

(22) Filed: Dec. 20, 2002

(65) Prior Publication Data

US 2004/0121774 A1    Jun. 24, 2004

(51) Int. Cl.
*H04W 36/00* (2006.01)
*H04W 4/00* (2006.01)

(52) U.S. Cl. .................... 455/438; 455/436; 455/440; 455/441; 370/311

(58) Field of Classification Search ............ 455/422.1, 455/435.1, 435.3, 436–451, 456.1–456.3, 455/456.5–456.6, 455, 524–525, 550.1, 552.1, 455/556.2, 560–561; 370/331, 343
See application file for complete search history.

(56) References Cited

U.S. PATENT DOCUMENTS

| | | | |
|---|---|---|---|
| 5,640,676 A * | 6/1997 | Garncarz et al. ............ 455/436 |
| 6,052,598 A * | 4/2000 | Rudrapatna et al. ...... 455/456.1 |
| 6,064,886 A | 5/2000 | Perez et al. |
| 6,125,278 A * | 9/2000 | Wieczorek et al. .......... 455/437 |
| 6,167,268 A * | 12/2000 | Souissi et al. ............... 455/434 |
| 6,304,755 B1 * | 10/2001 | Tiedemann et al. ......... 455/437 |
| 6,320,855 B1 * | 11/2001 | Shi ............................. 370/332 |
| 6,327,471 B1 * | 12/2001 | Song ........................... 455/440 |
| 6,393,003 B1 | 5/2002 | Lee |
| 6,564,057 B1 * | 5/2003 | Chun et al. ................. 455/437 |
| 6,603,751 B1 * | 8/2003 | Odenwalder ................ 370/331 |
| 6,654,609 B2 * | 11/2003 | Kim ............................ 455/437 |
| 6,721,567 B1 * | 4/2004 | Wang et al. ................. 455/440 |
| 7,149,477 B2 * | 12/2006 | Ogami ..................... 455/67.11 |
| 2001/0006514 A1 * | 7/2001 | Park ............................ 370/331 |
| 2001/0011019 A1 * | 8/2001 | Jokimies ..................... 455/449 |
| 2002/0082017 A1 * | 6/2002 | Hattori ....................... 455/436 |
| 2004/0097234 A1 * | 5/2004 | Rajkotia et al. ............. 455/442 |

* cited by examiner

*Primary Examiner*—Meless N Zewdu

(57) ABSTRACT

An apparatus and method for performing an interfrequency hard handoff at a border cell in a wireless network. The apparatus comprises a handoff controller within a source base station that selects an optimal target base station using location information of at least one target base station and using one of: a location of the wireless mobile station, a velocity of the wireless mobile station, and a direction of motion of the wireless mobile station. The present invention uses the location information of at least one target base station in order to make more reliable handoff decisions.

17 Claims, 7 Drawing Sheets

APPARATUS AND METHOD FOR PERFORMING AN INTERFREQUENCY HANDOFF IN A WIRELESS NETWORK

TECHNICAL FIELD OF THE INVENTION

The present invention is directed generally to wireless communication networks and, more specifically, to a base station that is capable of performing an interfrequency hard handoff of a wireless mobile station from a source base station to a target base station at a border cell in a wireless network.

BACKGROUND OF THE INVENTION

The radio frequency (RF) spectrum is a limited commodity. Only a small portion of the spectrum can be assigned to each communications industry. The assigned spectrum, therefore, must be used efficiently in order to allow as many frequency users as possible to have access to the spectrum. Multiple access modulation techniques are some of the most efficient techniques for utilizing the RF spectrum. Examples of such modulation techniques include time division multiple access (TDMA), frequency division multiple access (FDMA), and code division multiple access (CDMA).

Wireless service providers also seek other ways of using the available spectrum as efficiently as possible. One important technique for maximizing spectral efficiency is to minimize overhead message traffic. If the number of overhead messages transmitted is reduced, fewer overhead channels are required to carry overhead messages. This frees up spectrum for user traffic. Also, reducing the number of overhead messages reduces the processing load in both the mobile stations and the base stations of the wireless network.

As is well known, when a wireless mobile station moves from a cell that is served by a source base station to a cell that is served by a target base station it becomes necessary to transfer or handoff the wireless mobile station from the source base station to the target base station. In most wireless networks approximately forty percent (40%) to fifty percent (50%) of all active calls experience some type of handoff. These handoffs involve adding cells or dropping cells to an active call, or handing the call over to another cell under the control of another base station. In either case a decision must be made prior to the handoff identifying which base stations are to be involved in the handoff. If the base station selection algorithm that is employed is not robust, unnecessary air signaling and call quality degradation may result. Improvements to base station selection algorithms for handoffs can result in a lower call drop rate and better overall network performance.

In a wireless network each cell will have an assigned set of frequencies on which the cell operates. A cell is referred to as a "border cell" if it is located next to a neighbor cell that does not operate on the same frequencies. For example, a wireless mobile station may leave a first area that is served by a first wireless provider that uses a first set of frequencies and enter a second area that is served by a second wireless provider that uses a second set of frequencies. When the wireless mobile station leaves a border cell of the first area and enters a first cell of the second area, an interfrequency hard handoff must be performed to transfer control of the wireless mobile station from the border cell of the first area to the first cell of the second area.

A number of prior art techniques have been used to perform an interfrequency hard handoff. One such technique is referred to as the "pilot beacon" method. In the pilot beacon method, the target cell (i.e., the first cell of the second area) transmits a pilot signal on the same frequency used by the mobile station in the border cell to assist the wireless mobile station in determining the pilot strength of the target cell. The wireless mobile station determines the pilot strength of the target cell and triggers the interfrequency hard handoff based on the pilot strength information.

There are a number of disadvantages with the pilot beacon method. Additional expense is required to provide a pilot beacon. Each pilot beacon requires separate radio frequency (RF) upconversion circuits and amplifiers. The pilot signal normally is set to fifteen percent (15%) to twenty percent (20%) of the total power target cell. Providing either continuous or discontinuous pilot signals may result in a greater amount of interference. This results in a reduction in the capacity of the wireless network. The modules that are required to support the pilot beacons are very expensive and can cost as much as several tens of thousands of dollars.

Another prior art technique for performing an interfrequency hard handoff is referred to as the "distance based" method. In the distance-based method the base station in the border cell determines the distance of the wireless mobile station from the base station in the border cell. The base station makes the distance determination from the signal strength reported by the wireless mobile station on the Pilot Strength Measurement Messages (PSMM) that the wireless mobile station sends to the base station. If the signal from the wireless mobile station is too weak because the wireless mobile station is too far from the base station, then the base station will initiate an interfrequency hard handoff to the target base station. The target base station is closer to the wireless mobile station and has greater signal strength.

One of the primary disadvantages of the distance-based method is that the distance is determined solely on the basis of the power of the received signal of the wireless mobile station. The correlation of the distance with the power of the received signal is reliable only in environments in which the power of the received signal at points distant from the base transceiver station is known. Those skilled in the art will recognize that the power of the received signal at points distant from the transmitting antenna varies inversely with the square of the distance in the far field region. Furthermore, those skilled in the art will recognize that the propagation environment between the base transceiver station and mobile stations at different locations, but with the same range, may be vastly different. Measurements have shown that the received signal power at a particular location is random and normally distributed log-normally about a mean signal power value. Generally speaking, the large statistical distribution of the signal power with distance results in an unreliable prediction of the distance based on the power of the received signal in environments with multipath effects, fading effects, shadowing effects, additive combining, and doppler effects. These types of phenomena can produce misleading pilot strength signal readings at the wireless mobile station and cause the distance-based method to lead to erroneous handoff decisions.

Another prior art technique for performing an interfrequency hard handoff is referred to as the "candidate frequency search" method. In the candidate frequency search method information from the candidate frequency search set is used. When the wireless mobile station that is located in the border cell is operating in the traffic state, the base station of the border cell instructs the wireless mobile station to measure the pilot strengths in the given candidate frequency search set. The wireless mobile station periodically measures the signal strength of the pilots in each candidate frequency search set and reports the results of the measurements to the base station using the "Candidate Frequency Search Report Message." Depending upon the pilot strength information provided by the wireless mobile station to the base station, the base station initiates and performs an interfrequency hard handoff of the wireless mobile station to the target base station.

A serious disadvantage of the candidate frequency search method is that it requires a substantial amount of additional signaling traffic on the network and disrupts voice traffic during the transition. In addition, when the wireless mobile station is measuring the pilot strength in the different frequencies, the wireless mobile station has to sacrifice the traffic on its present frequency. This results in degraded voice and data service.

There is therefore a need in the art for an improved apparatus and method for performing an interfrequency handoff to transfer control of a wireless mobile station in a wireless network from a base station of a border cell in a first area to a base station of a neighboring cell in a second area. There is also a need in the art for an improved apparatus and method to provide an improved handoff decision control program that is capable of performing an interfrequency handoff of a wireless mobile station in a wireless network from a base station of a border cell in a first area to a base station of a neighboring cell in a second area.

SUMMARY OF THE INVENTION

To address the above-discussed deficiencies of the prior art, it is a primary object of the present invention to provide an improved apparatus and method for performing an interfrequency handoff of a wireless mobile station in a wireless network.

In one advantageous embodiment, the apparatus of the present invention comprises a handoff controller within a source base station of the wireless network. The handoff controller comprises a processor (and associated memory) and a handoff decision control program (and associated databases). The processor executes the handoff decision control program to select an optimal interfrequency target base station for an interfrequency handoff of a wireless mobile station.

The handoff controller in the source base station is capable of receiving location information from the wireless mobile station. The wireless mobile station comprises a Global Positioning System receiver or other type of position locator. The handoff controller in the source base station also comprises a base station location database that contains location information for base stations that are located in the vicinity of the source base station (including interfrequency target base stations in a neighboring network area).

The handoff controller in the source base station periodically monitors the location information of the wireless mobile station. The handoff controller is then able to calculate the location of the wireless mobile station with respect to the neighboring base stations, and the velocity and direction of motion of the wireless mobile station.

The handoff controller in the source base station determines at least one optimal target base station for an interfrequency handoff of a wireless mobile station by analyzing (1) the location of at least one target base station, (2) the location of the wireless mobile station, (3) the velocity of the wireless mobile station, (4) the direction of motion of the wireless mobile station, and (5) the pilot signal strengths of the surrounding base stations that the wireless mobile station can receive.

The interfrequency handoff decision is more reliable when location information is incorporated within the decision process.

It is an object of the present invention to provide an apparatus and method for use in a source base station in a wireless network to select at least one optimal target base station for an interfrequency handoff of a wireless mobile station.

It is a further object of the present invention to provide an apparatus and method for selecting an optimal interfrequency target base station that bases an interfrequency handoff decision on location information of candidate interfrequency target base stations.

It is also an object of the present invention to provide an apparatus and method for creating a preferential order of interfrequency target base stations to which to hand off a wireless mobile station during an interfrequency handoff in a wireless network.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless mobile station.

Figure 1:
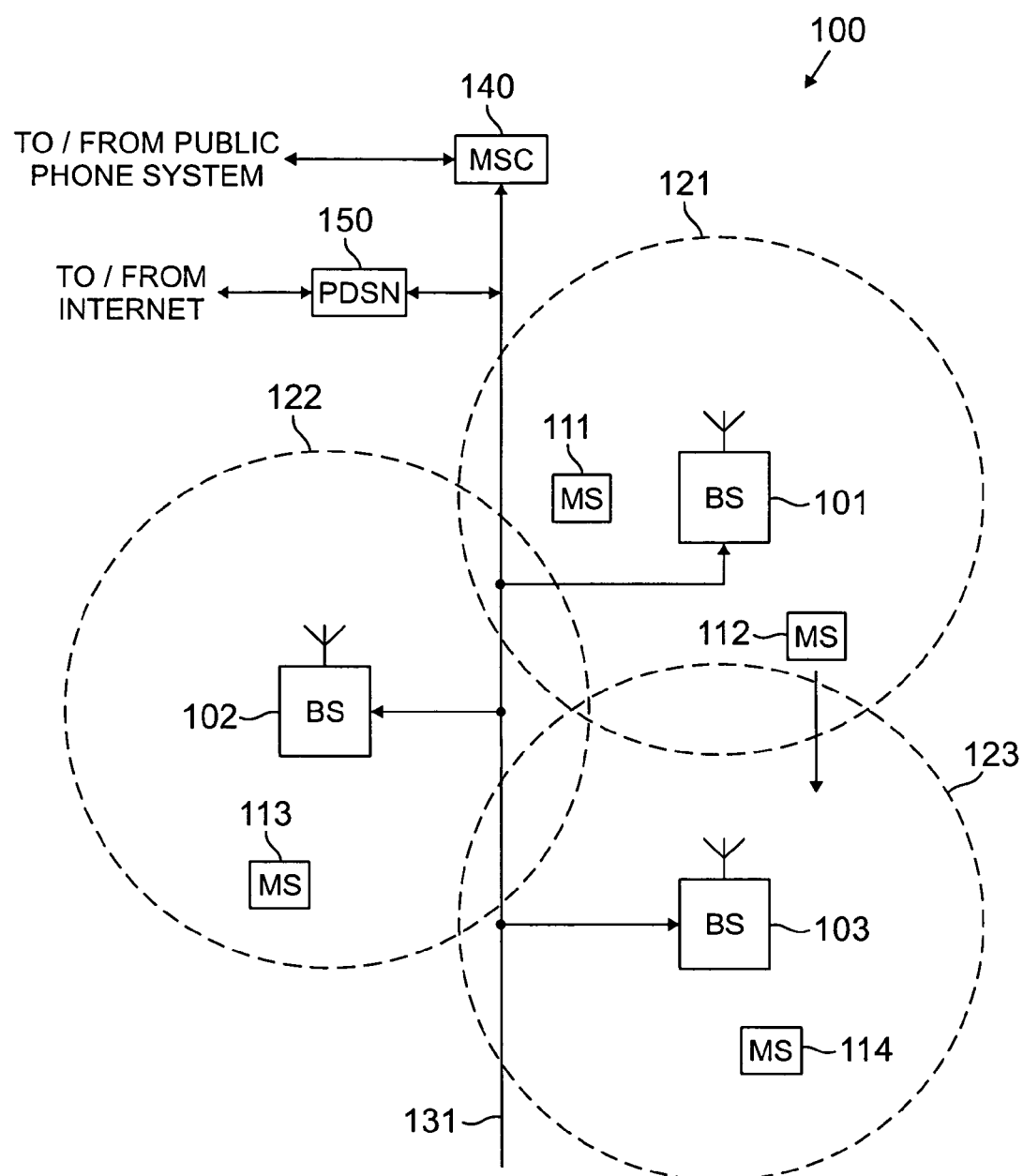
FIG. 1 illustrates a first exemplary wireless network according to an advantageous embodiment of the present invention.

FIG. 1 illustrates a first exemplary wireless network 100 in which the base stations and the mobile stations operate in accordance with the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over, for example, code division multiple access (CDMA) channels. Mobile stations 111-114 may be any suitable wireless communication devices, including conventional cellular radiotelephones, Personal Communications System (PCS) handset devices, portable computers, telemetry devices, personal digital assistants, and the like, that are capable of communicating with the base stations via wireless radio links. Other types of access terminals, including fixed wireless access terminals, may also be present in wireless network 100. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any particular cell site configuration.

In one advantageous embodiment of the present invention, each of the base stations BS 101, BS 102, and BS 103 comprise a base station controller (BSC) and one or more base transceiver subsystems (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the radio frequency (RF) transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public switched telephone network (PSTN) and/or the Internet (not shown). Communications line 131 links each vocoder in the base station controller (BSC) with switch elements in the mobile switching center (MSC) 140. In one advantageous embodiment of the present invention, each link provides a digital path for transmission of voice signals in the pulse code modulation (PCM) format. Communications line 131 may be any suitable connection means, including a T1 line, a T3 line, a fiber optic link, a network backbone connection, and the like. In some embodiments, communications line 131 may be several different data links, where each data link couples one of BS 101, BS 102, or BS 103 to MSC 140.

BS 101, BS 102 and BS 103 transfer data signals, such as packet data, between each other and the Internet or other packet data network (not shown) via communications line 131 and packet data serving node (PDSN) 150. Packet data serving node (PDSN) 150 is well known to those skilled in the art.

Communications line 131 also provides a connection path to transfer control signals between MSC 140 and BS 101, BS 102 and BS 103 used to establish connections for voice and data circuits between MSC 140 and BS 101, BS 102 and BS 103. Those skilled in the art will recognize that the connections on communications line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on communications line 131 may provide a transmission path for transmissions of analog or digital control signals in a suitable signaling protocol.

One or more of the wireless devices in wireless network 100 may be capable of executing real time applications, such as streaming audio or streaming video applications. Wireless network 100 receives the real time data from, for example, the Internet through packet data serving node (PDSN) 150 and through communications line 131 and transmits the real time data in the forward channel to the wireless device. For example, MS 112 may comprise a 3G cellular phone device that is capable of surfing the Internet and listening to streaming audio, such as music from a music web site or a sports radio broadcast from a sports web site. To avoid increasing the memory requirements and the size of wireless phone devices, one or more of the base stations in wireless network 100 provides real time data buffers that can be used to buffer real time data being sent to, for example, MS 112.

In first exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123. The direction arrow proximate MS 112 indicates the movement of MS 112 towards cell site 123. At some point, as MS 112 moves into cell site 123 and out of cell site 121, a handoff will occur.

As is well known to those skilled in the art, the hand-off procedure transfers control of a call from a first cell site to a second cell site. A handoff may be either a "soft handoff" or a "hard handoff." In a "soft handoff" a connection is made between the mobile station and the base station in the second cell before the existing connection is broken between the mobile station and the base station in the first cell. In a "hard handoff" the existing connection between the mobile station and the base station in the first cell is broken before a new connection is made between the mobile station and the base station in the second cell.

For example, assume that mobile stations 111-114 communicate with base stations BS 101, BS 102 and BS 103 over code division multiple access (CDMA) channels. As MS 112 moves from cell 121 to cell 123, MS 112 detects the pilot signal from BS 103 and sends a Pilot Strength Measurement Message (PSMM) to BS 101. When the strength of the pilot that is transmitted by BS 103 and received and reported by MS 112 to BS 101 exceeds a threshold, BS 101 initiates a handoff process by signaling MS 112 and the target BS 103 that a handoff is required. The details of the handoff process are described in TIA/EIA IS-95 or TIA/EIA IS-2000 family of standards.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that a soft handoff improves the performance on both the forward channel (BS to MS) links and the reverse channel (MS to BS) links. When the signal from BS 101 falls below a predetermined signal strength threshold, MS 112 may then drop the link with BS 101 and only receive signals from BS 103. The call is thereby seamlessly transferred from BS 101 to BS 103. The soft handoff described above assumes that the mobile station is in a voice or data call. An idle handoff is a handoff between cells of a mobile device that is communicating in the control or paging channel, rather than transmitting voice and/or data signals in the regular traffic channels.

Figure 2:
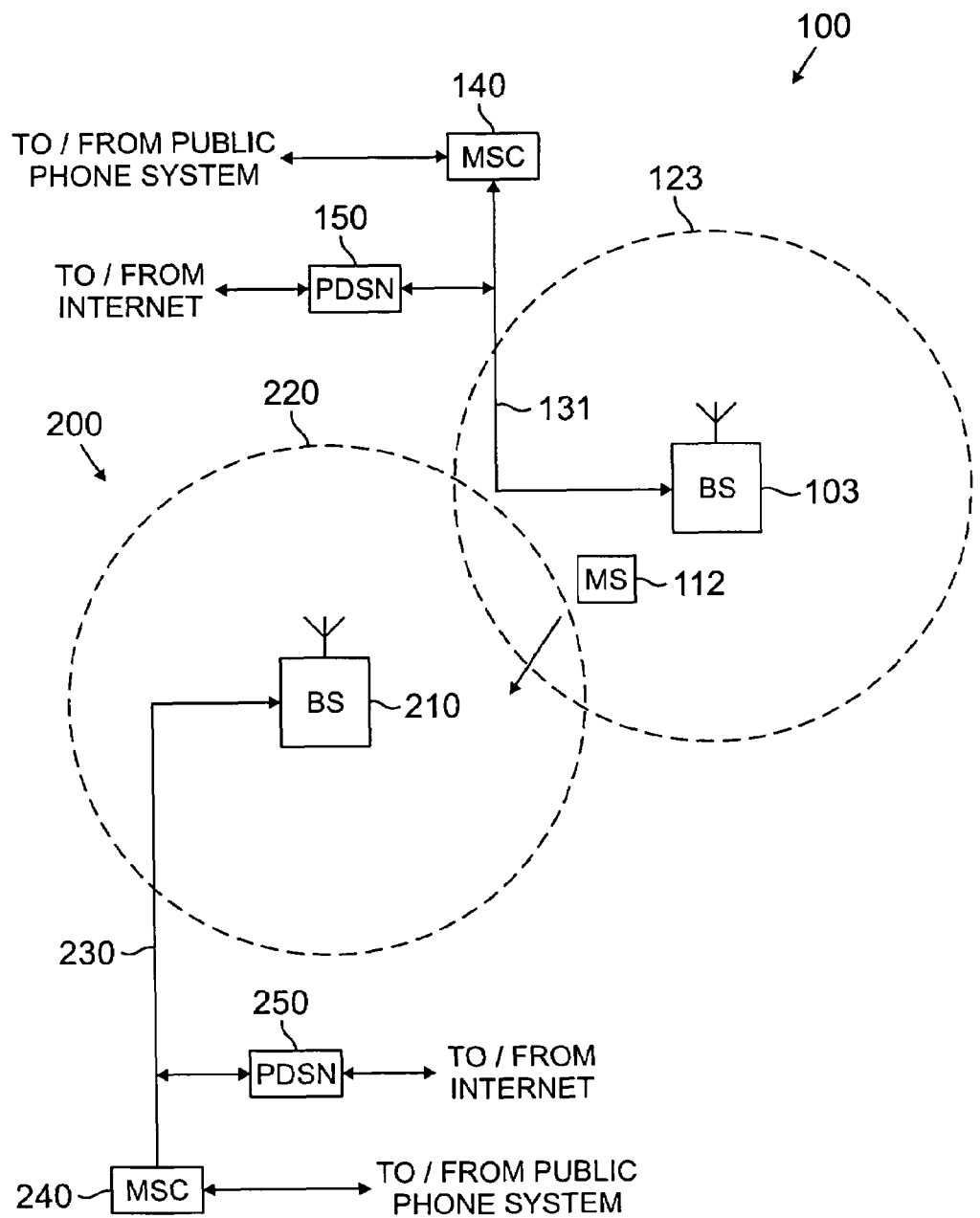
FIG. 2 illustrates a portion of the first exemplary wireless network shown in FIG. 1 and a portion of a second exemplary wireless network according to an advantageous embodiment of the present invention.

FIG. 2 illustrates a portion of first exemplary wireless network 100 shown in FIG. 1 and a portion of a second exemplary wireless network 200 according to an advantageous embodiment of the present invention. Second exemplary wireless network 200 is similar to first exemplary wireless network in that both first network 100 and second network 200 comprise a plurality of base stations and mobile stations.

For purposes of clarity only one base station (base station 210) of second exemplary wireless network 200 is shown in FIG. 2. Base station 210 serves cell site 220. A dotted line shows the approximate boundary of cell site 220 in which base station 210 is located. Cell site 220 is shown approximately circular for the purposes of illustration and explanation only. It should be clearly understood that all of the cell sites of second wireless network 200 may have other irregular shapes, depending on the cell configuration selected and natural and man-made obstructions.

As shown in FIG. 2, base station 210 communicates with mobile switching center (MSC) 240 and packet data serving node (PDSN) 250 and through communications line 230. Base station 210 also communicates with the other base stations (not shown) in second wireless network 200 through communications line 230. In one advantageous embodiment of the present invention, second wireless network 200 comprises base stations that do not operate in accordance with the principles of the present invention. In another advantageous embodiment of the present invention, second wireless network 200 comprises base stations that do operate in accordance with the principles of the present invention.

As shown in FIG. 2, MS 112 is moving from BS 103 (out of first wireless network 100) towards BS 210 (into second wireless network 200). Therefore cell site 123 of first wireless network 100 is a "border cell" of first wireless network 100 and cell site 220 of second wireless network 200 is a "border cell" of second wireless network 200. BS 210 in cell site 220 of second wireless network 200 is operating on a different set of frequencies than that of BS 103 of first wireless network 100. Because MS 112 is operating on the frequency set of first wireless network 100, MS 112 is not monitoring the frequency set of BS 210 of second wireless network 200. As will be more fully described, BS 103 is capable of initiating and performing an interfrequency hard handoff of MS 112 from BS 103 to BS 210.

A "border cell" may also occur within a wireless network. For example, assume that base station 101 of cell site 121 of wireless network 100 is operating on two frequencies, F1 and F2. Further assume that base station 103 of cell site 123 of wireless network 100 is operating on two frequencies, F1 and F3. Further assume that mobile station 112 is operating on frequency F2 as it moves from cell site 121 to cell site 123. Base station 103 is not operating on frequency F2. Therefore cell site 121 of first wireless network 100 is a "border cell" within first wireless network 100 with respect to frequency F2.

Figure 3:
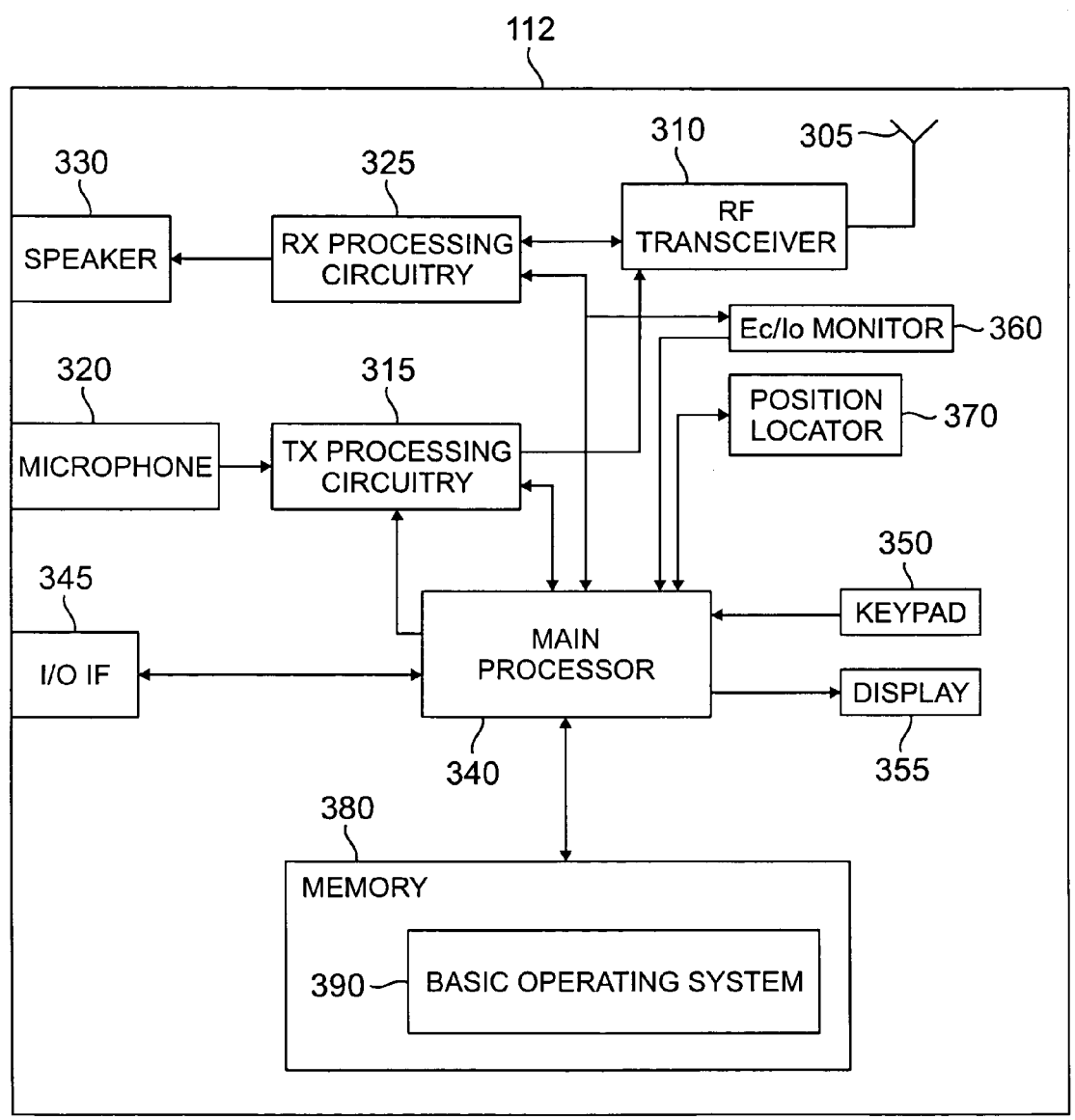
FIG. 3 illustrates an exemplary prior art wireless mobile station that may be used in conjunction with one or more base stations of the present invention.

FIG. 3 illustrates an exemplary prior art wireless mobile station 112 that may be used in conjunction with one or more base stations of the present invention. Wireless mobile station 112 comprises antenna 305, radio frequency (RF) transceiver 310, transmitter (TX) processing circuitry 315, microphone 320, receiver (RX) processor circuitry 325, speaker 330, main processor 340, input/output (I/O) interface (IF) 345, keypad 350, display 355, and memory 380. Those skilled in the art will recognize that antenna 305 may consist of a single element, such as a dipole antenna, or may consist of an array of elements such as in a phased array antenna, a multiple-input-multiple-output (MIMO) antenna, or in an adaptive array antenna. Memory 380 comprises basic operating system (OS) software 390. Memory 380 also comprises other computer software (not shown) for operating wireless mobile station 112.

Wireless mobile station 112 further comprises $E_c/I_o$ monitor 360. $E_c/I_o$ monitor 360 monitors the signal-to-noise ratio (SNR) of the incoming forward channel signals transmitted by the base stations and received by receiver (RX) processing circuitry 325. Main processor 340 stores the $E_c/I_o$ ratio data from $E_c/I_o$ monitor 360 in memory locations (not shown) within memory 380. Main processor 340 stores the $E_c/I_o$ ratio data over time for each base station within the active set and the neighbor set.

Wireless mobile station 112 further comprises position locator 370. Position locator 370 may comprise a global positioning system (GPS) receiver. It is understood that other types of position location equipment may be employed. Position locator 370 may comprise, for example, a time of arrival (TOA) position locator system, a time difference of arrival (TDOA) position locator system, or an angle of arrival (AOA) position locator system that employs an antenna array. These types of position locator systems are well known in the art. Other types of position locator systems may also be used. For purposes of describing the present invention it will be assumed that position locator 370 is a global positioning system (GPS) receiver 370. Position locator 370 will sometimes be referred to as global positioning system (GPS) receiver 370.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal to produce a processed baseband signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In an advantageous embodiment of wireless mobile station 112, main processor 340 is a microprocessor or microcontroller. Memory 380 is coupled to main processor 340. Memory 380 may comprise solid-state memory such as random access memory (RAM), various types of read-only memory (ROM), or Flash RAM. Memory 380 may also comprise other types of memory such as "micro" hard drives or removable storage media that store data.

Main processor 340 executes basic operating system (OS) software 390 stored in memory 380 in order to control the overall operation of wireless mobile station 112. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 390. Main processor 340 can move data into or out of memory 380, as required by an executing process. Main processor 340 is also coupled to I/O interface 345. I/O interface 345 provides mobile station 112 with the ability to connect to other devices such as laptop computers and handheld computers. I/O interface 345 is the communication path between these accessories and main controller 340.

Main processor 340 is also coupled to keypad 350 and display unit 355. The end user of mobile station 112 uses keypad 350 to enter data into mobile station 112. Display 355 may be a liquid crystal display capable of rendering text and/or at least limited graphics from web sites. Alternate embodiments may use other types of displays.

Main processor 340 is also capable of controlling and/or interfacing with $E_c/I_o$ monitor 360 and position locator 370. Under the control of main processor 340, wireless mobile station 112 is able to obtain pilot strength measurements of the base stations in the active set and in the neighbor set of wireless mobile station 112. Also under the control of main processor 240, wireless mobile station 112 is able to obtain the location of wireless mobile station 112 from position locator 370.

Figure 4:
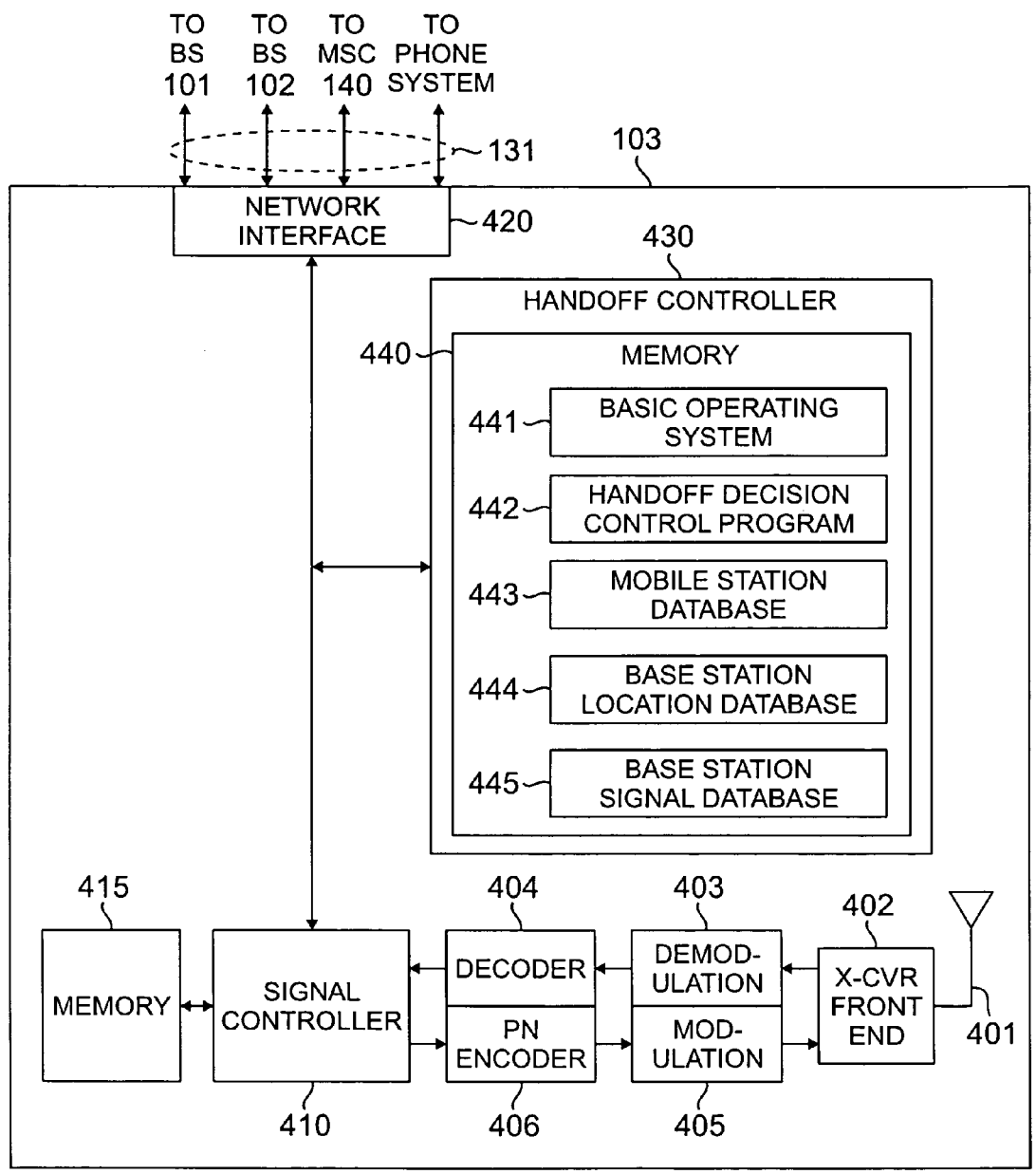
FIG. 4 illustrates an exemplary base station according to an advantageous embodiment of the present invention.

FIG. 4 illustrates an exemplary base station (BS) 103 in is first wireless network 100 according to an advantageous embodiment of the present invention. BS 103 comprises an antenna 401, transceiver front-end circuitry 402, demodulation circuitry 403 and modulation circuitry 405. Those skilled in the art will recognize that antenna 401 may consist of a single element, such as a dipole antenna, or may consist of an array of elements such as in a phased array antenna, a multiple-input-multiple-output (MIMO) antenna, or in an adaptive array antenna. Transceiver front-end circuitry 402 contains low-noise amplification circuitry for amplifying reverse channel RF signals received by antenna 401. The amplified reverse channel RF signals are demodulated by demodulation circuitry 403, thereby recovering the baseband data traffic or control message signal that was sent in the reverse channel by one or more of the mobile stations. Modulation circuitry 405 receives data traffic and control messages from pseudo-random noise (PN) encoder 406 and modulates these signals to produce a modulated forward channel RF signal. Transceiver front-end circuitry 402 also contains power amplifiers for amplifying the modulated forward channel RF signals received from modulation circuitry 405.

Within BS 103, signal controller 410 controls the flow of data traffic messages and control messages sent and received by transceiver front-end circuitry 402. Signal controller 410 is coupled to memory 415, which may be used to hold data traffic and control messages and to store the operating program executed by signal controller 410.

Signal controller 410 receives voice and/or data traffic destined for a mobile station from other base stations or the public phone system via communications line 131 and network interface 420. Signal controller 410 sends these baseband signals received from communications line 131 to PN encoder 406, which encodes and thereby spreads the baseband signal with a pseudo-random noise sequence, according to conventional CDMA techniques. The spread baseband signal is then modulated on a carrier wave by modulation circuit 405.

Signal controller 410 also receives an incoming baseband information signal from decoder 404. The input to decoder 404 is a spread baseband signal that has been demodulated by demodulation circuit 403. Decoder 404 essentially reverses the spreading function performed by a PN encoder in the transmitting mobile station based to thereby produce a despread baseband signal that contains voice/data traffic and command messages received from one or more mobile stations. Signal controller 410 may then transfer the received voice/data traffic to other base stations, to a server, or to the public phone system via communications line 131 and network interface 420.

BS 103 also comprises handoff controller 430, which is responsible for controlling handoffs, including idle handoffs during an access state operation, in accordance with the principles of the present invention. In an advantageous embodiment of the present invention, handoff controller 430 is a microprocessor or microcontroller. Handoff controller 430 comprises memory 440. Memory 440 may comprise solid-state memory such as random access memory (RAM), various types of read-only memory (ROM), or Flash RAM. Memory 440 may also comprise other types of memory such as "micro" hard drives or removable storage media that store data.

Memory 440 comprises basic operating system (OS) 441, handoff decision control program 442, mobile station database 443, base station location database 444, and base station signal database 445.

The location of base station 103 is stored in base station location database 444 in memory 440. The location of other base stations in wireless network 100 and the location of base stations in wireless network 200 are also stored in base station location database 444 in memory 440. The locations of the base stations may be in the form of latitude and longitude coordinates. When wireless mobile station 112 enters cell site 220 of wireless network 200 the latitude and longitude coordinates for interfrequency target base station 210 have already been stored in base station 103 in base station location database 444.

Handoff controller 430 executes handoff decision control program 442 to execute an interfrequency handoff selection algorithm according to the principles of the present invention. As will be more fully described, the interfrequency handoff selection algorithm identifies a preferential order of target base stations for a handoff of wireless mobile station 112. Handoff controller 430 and handoff decision control program 442 comprise a handoff controller that is capable of executing the interfrequency handoff selection algorithm of the present invention.

Wireless mobile station 112 determines its location from position locator 370 and sends the location information to handoff controller 430. Handoff decision control program 442 uses the location information of wireless mobile station 112 to determine the location of wireless mobile station 112 with respect to the known location of the surrounding base stations. Handoff decision control program 442 stores each location of wireless mobile station 112 obtained from position locator 270 in a memory location within mobile station database 443. Handoff decision control program 442 continues to read and store the location information of wireless mobile station 112 over time.

Handoff controller 430 executes handoff decision control program 442 and uses the location information of wireless mobile station 112 to periodically calculate the velocity of wireless mobile station 112. Handoff decision control program 442 obtains a first location of wireless mobile station 112 at a first time (denoted "t1"). Handoff decision control program 442 then obtains a second location of wireless mobile station 112 at a second later time (denoted "t2"). Handoff decision control program 442 then calculates the average velocity of wireless mobile station 112 (from time t1 to time t2) by dividing the magnitude of the change of location of mobile station 112 (i.e., the location of wireless mobile station 112 at time t2 minus the location of wireless mobile station 112 at time t1) by the time difference (i.e., time t2 minus time t1). Handoff decision control program 442 then stores the calculated value of the average velocity of wireless mobile station 112 in a memory location in mobile station database 443.

Handoff controller 430 executes handoff decision control program 442 and uses the location information of wireless mobile station 112 to periodically calculate the direction of motion of wireless mobile station 112. Handoff decision control program 442 uses the first location of wireless mobile station 112 at time t1 and the second location of wireless mobile station 112 at time t2 to determine the direction of motion of wireless mobile station 112 from time t1 to time t2. Handoff decision control program 442 then stores the calculated value of the direction of motion of wireless mobile station 112 in a memory location in mobile station database 443.

Handoff controller 430 also requests wireless mobile station 112 to send to handoff controller 430 a pilot strength measurement signal of base station 103. Base station 103 can request wireless mobile station 112 to send a Pilot Strength Measurement Message (PSMM) by sending a Pilot Measurement Request Order (PMRO) to wireless mobile station 112. To obtain the pilot strength information on a continuing basis, base station 103 can request wireless mobile station 112 to send a Periodic Pilot Strength Measurement Message (PPSMM) by sending a Periodic Pilot Measurement Request Order (PPMRO) to wireless mobile station 112.

Because wireless mobile station 112 is not operating on any frequency that is being transmitted by interfrequency target base station 210, wireless mobile station 112 is not able to send a pilot strength measurement signal of interfrequency target base station 210.

Handoff decision control program 442 also uses the pilot strength information of base station 103 as received at wireless mobile station 112 to determine the location of wireless mobile station 112 with respect to the known location of the surrounding base stations. Handoff decision control program 442 stores each measurement of pilot strength information of base station 103 (and each measurement of pilot strength information of the surrounding base stations) as received at wireless mobile station 112 in a memory location within base station signal database 445.

Handoff controller 430 also requests wireless mobile station 112 to send to handoff controller 430 pilot strength measurement signals of other base stations that wireless mobile station 112 can receive. Handoff decision control program 442 also stores each measurement of pilot strength information of the other base stations as received at wireless mobile station 112 in a memory location within base station signal database 445.

Handoff decision control program 442 determines an optimal interfrequency target base station for an interfrequency handoff of wireless mobile station 112 by analyzing (1) the location of at least one target base station, (2) the location of wireless mobile station 112, (3) the velocity of wireless mobile station 112, (4) the direction of motion of wireless mobile station 112, and (5) the pilot signal strengths of the surrounding base stations that wireless mobile station 112 can receive.

In addition to continually monitoring the pilot signal strength of the surrounding base stations, handoff decision control program 442 continually marks the location of wireless mobile station 112 and computes the distance to the surrounding base stations. Handoff decision control program 442 uses these distance measurements over time to project the path of wireless mobile station 112 towards (or away from) the surrounding base stations. Handoff decision control program 442 uses an average measurement over a period of time in order to avoid short-term fluctuations in velocity, direction of motion, or detected pilot signal strength levels. Handoff decision control program 442 uses these parameters to make an optimal interfrequency handoff decision (i.e., to find the optimal interfrequency target base station for wireless mobile station 112).

Handoff decision control program 442 performs the calculations described above to find the most preferred interfrequency target base station for the interfrequency hard handoff. Handoff decision control program 442 then evaluates all of the remaining interfrequency target base stations and prepares a preferred order (i.e., ranking) of interfrequency target base stations for the interfrequency hard handoff. The most preferred interfrequency target base station is the first interfrequency target base station listed in the preferential order of interfrequency target base stations.

Handoff decision control program 442 then selects the most preferred target base station in the preferential order of target base stations to be the base station to which mobile station 112 is to be handed off. The most preferred interfrequency target base station in the preferential order of interfrequency target base stations in this example is base station 210. Alternatively, handoff decision control program 442 selects more than one preferred target base station.

If handoff decision control program 442 happens to identify an interfrequency target base station that has a common frequency with source base station 103, then source base station 103 can initiate a soft handoff procedure on the common frequency shared by the interfrequency target base station and source base station 103. This soft handoff mode of operation supplements the interfrequency hard handoff mode of operation of the present invention.

Figure 5:
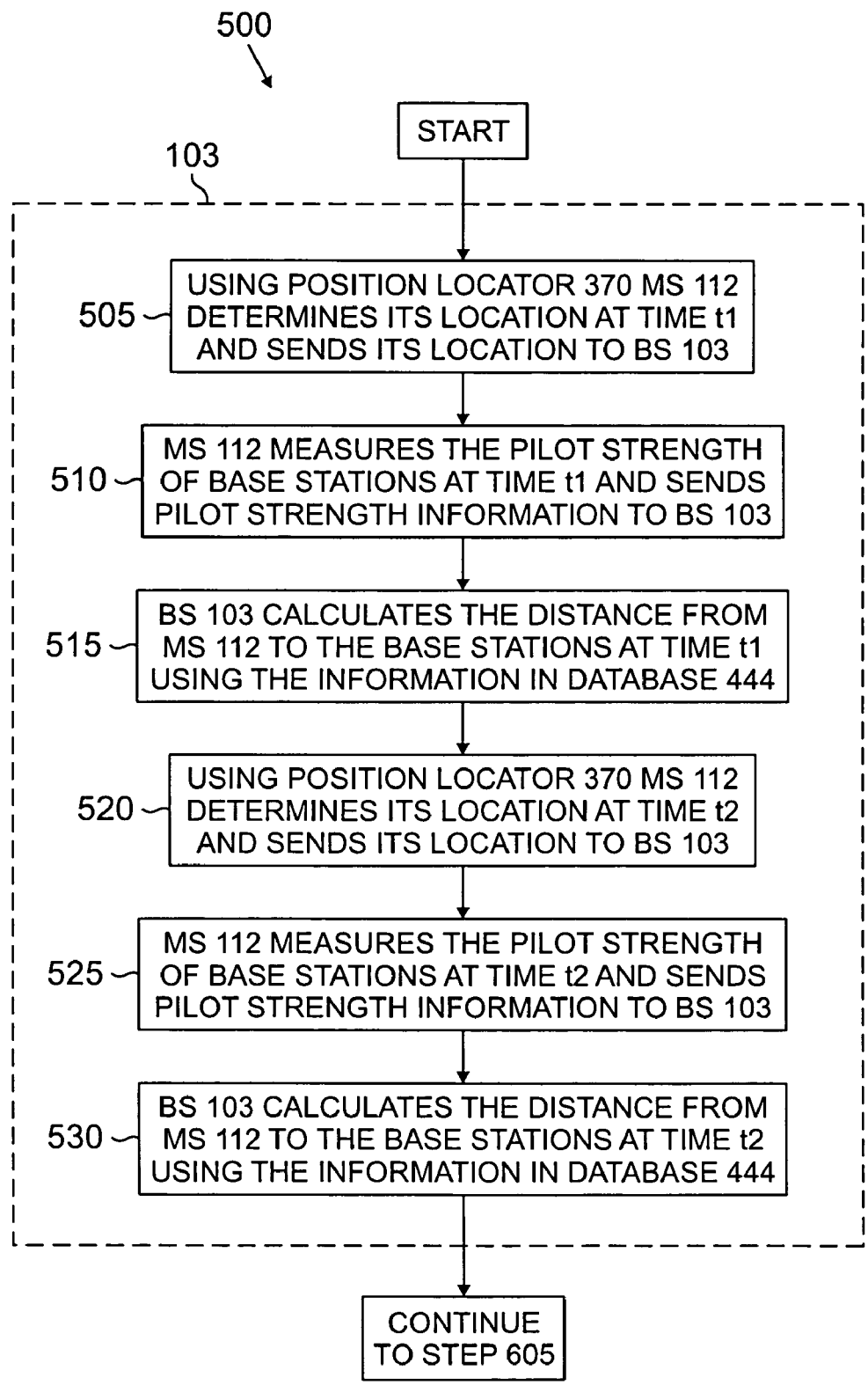
FIG. 5 is a flow diagram illustrating a first portion of the operation of an exemplary base station according to an advantageous embodiment of the present invention.
Figure 6:
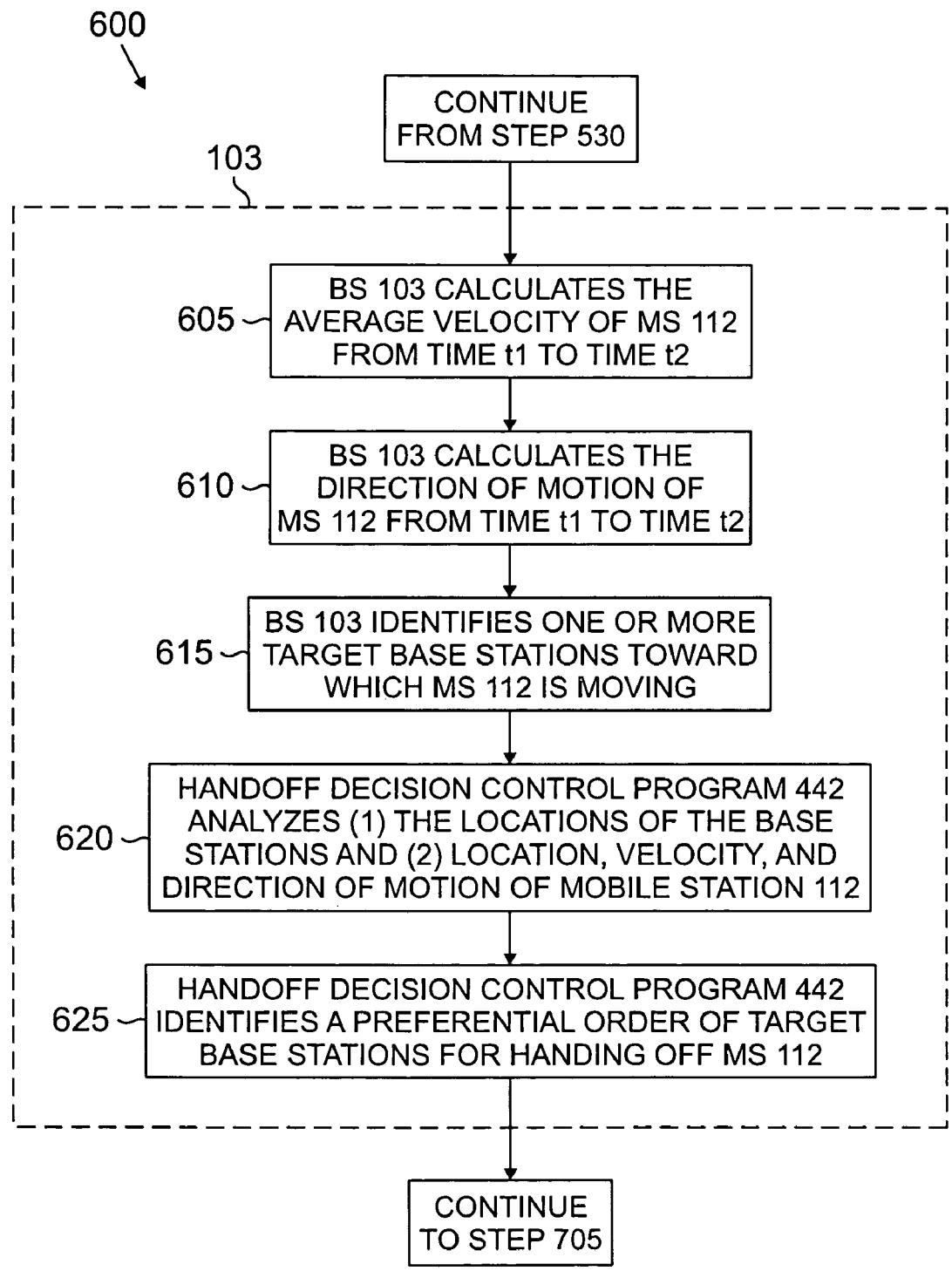
FIG. 6 is a flow diagram illustrating a second portion of the operation of an exemplary base station according to an advantageous embodiment of the present invention.
Figure 7:
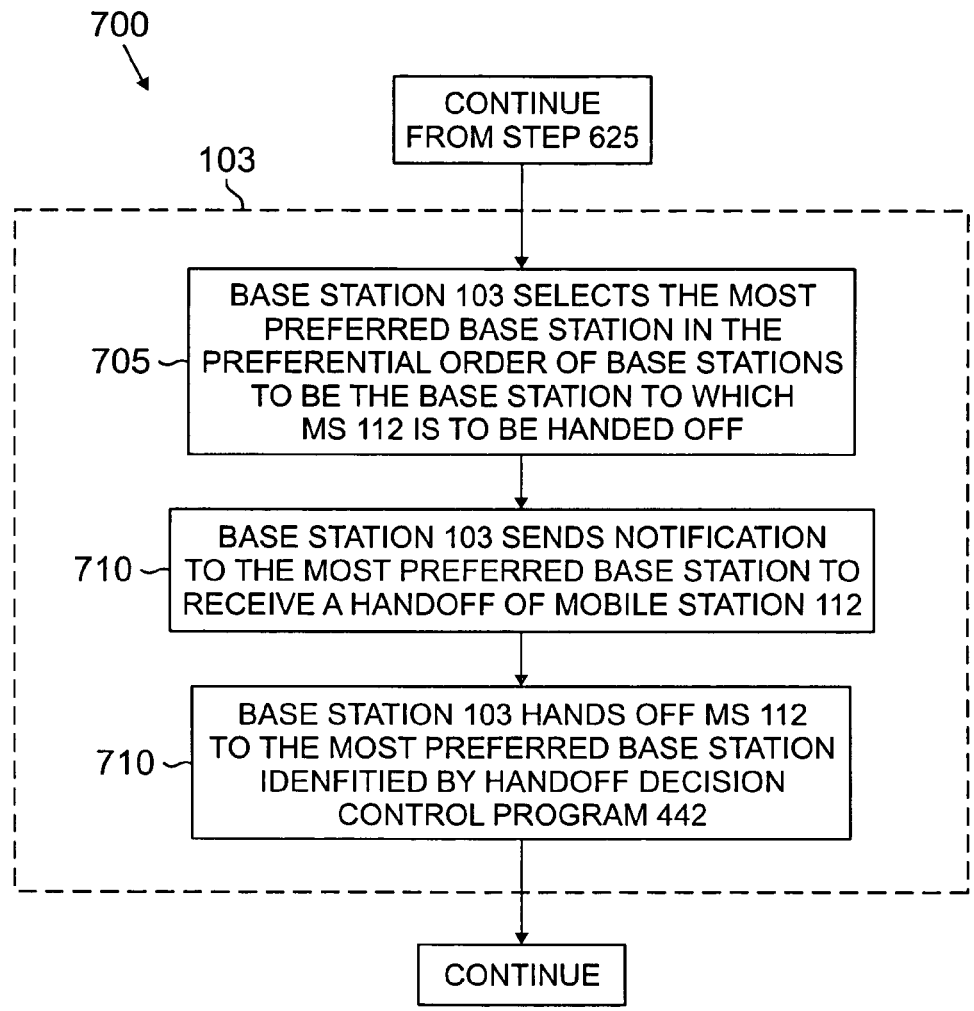
FIG. 7 is a flow diagram illustrating a third portion of the operation of an exemplary base station according to an advantageous embodiment of the present invention.

FIGS. 5, 6 and 7 comprise a flow diagram illustrating the operation of base station 103 according to an advantageous embodiment of the present invention. The steps in FIG. 5 are collectively referred to with reference numeral 500. The steps in FIG. 6 are collectively referred to with reference numeral 600. The steps in FIG. 7 are collectively referred to with reference numeral 700.

As previously described, handoff controller 430 of base station 103 comprises handoff decision control program 442. Handoff controller 430 in base station 103 performs the steps of the method of the present invention. However, for simplicity, the term "base station 103" will be used in the description of the method that follows. It is understood that this term refers to a base station that comprises a handoff controller 430 of the present invention.

At a first time (denoted "t1") mobile station 112 uses position locator 370 to determine the location of mobile station 112 and sends the location information to base station 103 (step 505). Also at time t1 mobile station 112 measures the pilot strength of base stations in the active set and in the neighbor set and sends the pilot strength information to base station 103 (step 510). Base station 103 then calculates the distance from mobile station 112 to each of the surrounding base stations (including interfrequency target base station 210) at time t1 using base station location information that is stored in base station location database 444 (step 515).

At a second later time (denoted "t2") mobile station 112 uses position locator 370 to determine the location of mobile station 112 and sends the location information to base station 103 (step 520). Also at time t2 mobile station 112 measures the pilot strength of base stations in the active set and in the neighbor set and sends the pilot strength information to base station 103 (step 525). Base station 103 then calculates the distance from mobile station 112 to each of the surrounding base stations (including interfrequency target base station 210) at time t2 using base station location information that is stored in base station location database 444 (step 530).

Base station 103 then calculates the average velocity of mobile station 112 from time t1 to time t2 (step 605). Base station 103 calculates the average velocity of mobile station 112 by dividing the amount of location change (i.e., the location of MS 112 at time t2 minus the location of MS 112 at time t1) by the time difference (i.e., time t2 minus time t1). Base station 103 may store the calculated value of the average velocity of mobile station 112 in mobile station database 443. Base station 103 then calculates the direction of motion of mobile station 112 from time t1 to time t2 (step 610). Base station 103 calculates the direction of motion of MS 112 from the location of MS 112 at time t2 and the location of MS 112 at time t1. Base station 103 may store the calculated direction of motion of MS 112 in mobile station database 443.

Base station 103 then uses the calculated direction of motion of MS 112 and the locations of the target base stations stored in base station location database 444 to identify one or more target base stations toward which MS 112 is moving (step 615). Handoff decision control program 442 of base station 103 then analyzes (1) the location information of the target base stations that have been stored in base station signal database 445, and (2) the location, velocity, and direction of motion of mobile station 112 (step 620). Handoff decision control program 442 of base station 103 identifies a preferential order of target base stations to which MS 112 may be handed off (step 625). The most preferred target base station is the first target base station listed in the preferential order of target base stations.

Base station 103 selects the most preferred target base station in the preferential list of target base stations to be the base station to which mobile station 112 is to be handed off (step 705). Base station 103 then sends notification to the most preferred target base station (interfrequency target base station 210 in this example) to receive a handoff of mobile station 112 (step 710). Base station 101 then hands off mobile station 112 to the most preferred target base station that has been identified by handoff decision control program 442 (step 715). In this manner mobile station 112 is handed off to an optimal target base station.

In order to support the present invention the following messages will need to be modified: (1) Neighbor List Message (NLM), (2) Universal Neighbor List Message (UNLM), (3) Private Neighbor List Message (PNLM), (4) General Neighbor List Message (GNLM), (5) Extended Neighbor List Message (ENLM), (6) Neighbor List Update Message (NLUM), and (7) Extended Neighbor List Update Message (ENLUM). In each case, each message needs to be modified to add latitude and longitude coordinate information for the neighbor base stations.

The present invention provides several advantages over the prior art. Because the handoff decision in the present invention uses additional decision parameters and is not based solely on pilot strength information, the call drop rate is significantly reduced. This results in more successful call completion ratios.

The present invention for providing an interfrequency handoff at a border cell is simpler and easier to implement than prior art apparatus and methods. The present invention does not require major infrastructure changes in order to be implemented. The present invention is also significantly less expensive than prior art apparatus and methods. The present invention reduces the quantity of signaling traffic on the network that would otherwise be needed to provide an interfrequency handoff.

The present invention also provides better call quality compared to the call quality that is provided by the candidate frequency search method. The present invention accomplishes this by avoiding having the mobile station search throughout different frequencies.

The present invention also provides better capacity in border cells due to the absence of interference that would otherwise be caused by a pilot beacon or a hopping pilot beacon.

Although the present invention has been described in detail, those skilled in the art should understand that they can make various changes, substitutions and alterations herein without departing from the spirit and scope of the invention in its broadest form.

What is claimed is:

1. For use in a source base station for communicating with a wireless mobile station in a wireless network, an apparatus for selecting at least one target base station for a handoff of said wireless mobile station, said apparatus comprising:
a base station location database, said base station location database containing location information of a plurality of base stations; and
a handoff controller for selecting said at least one target base station for an interfrequency hard handoff based on a location information of said at least one target base station contained in said base station location database and one of: a geographic location of said wireless mobile station, a velocity of said wireless mobile station, and a direction of motion of said wireless mobile station,
wherein said handoff controller receives a message that contains base station location information, and said handoff controller selects said at least one target base station for the interfrequency hard handoff based on at least one pilot signal strength measurement received by said wireless mobile station, and
wherein said handoff controller places said base station location information from said message in said base station location database and creating, from said base station location database, a preferential order of target base stations to which to hand off said wireless mobile station.

2. The apparatus as set forth in claim 1 wherein said handoff controller comprises:
a processor within said source base station;
a memory coupled to said processor; and
a handoff decision control program within said memory, said handoff decision control program executed by said processor to select said at least one target base station for said handoff of said wireless mobile station.

3. The apparatus as set forth in claim 1 wherein said handoff controller receives said geographic location of said wireless mobile station and calculates a distance of said wireless mobile station to the at least one selected target base station.

4. The apparatus as set forth in claim 1 wherein said handoff controller receives a first geographic location of said wireless mobile station at a first time and a second geographic location of said wireless mobile station at a second time and calculating the velocity of said wireless mobile station.

5. The apparatus as set forth in claim 1 wherein said handoff controller receives a first geographic location of said wireless mobile station at a first time and a second geographic location of said wireless mobile station at a second time and calculating the direction of motion of said wireless mobile station.

6. The apparatus as set forth in claim 1 wherein said preferential ranking of said target base stations is selected by using the location information of said target base stations and using one of:
the geographic location of said wireless mobile station;
the velocity of said wireless mobile station; and
the direction of motion of said wireless mobile station.

7. A source base station comprising:
an apparatus for selecting at least one target base station for a handoff of a wireless mobile station, said apparatus comprising:
a base station geographic location database, said base station location database containing location information of a plurality of base stations; and
a handoff controller for selecting said at least one target base station for an interfrequency hard handoff based on a location information of said at least one target base station contained in said base station location database and one of: a location of said wireless mobile station, a velocity of said wireless mobile station, and a direction of motion of said wireless mobile station,
wherein said handoff controller receives a message that contains base station location information, and said handoff controller selects said at least one target base station for the interfrequency hard handoff based on at least one pilot signal strength measurement received by said wireless mobile station; and
wherein said handoff controller places said base station location information from said message in said base station location database and creating, from said base station location database, a preferential order of target base stations to which to hard hand off said wireless mobile station.

8. The source base station as set forth in claim 7 wherein said handoff controller comprises:
a processor within said source base station;
a memory coupled to said processor; and
a handoff decision control program within said memory, said handoff decision control program executable by said processor to select said at least one target base station for said hard handoff of said wireless mobile station.

9. The source base station as set forth in claim 7 wherein said handoff controller receives said geographic location of said wireless mobile station and calculates a distance of said wireless mobile station to at least one interfrequency target base station.

10. The source base station as set forth in claim 7 wherein said handoff controller receives a first geographic location of said wireless mobile station at a first time and a second geographic location of said wireless mobile station at a second time and calculating the velocity of said wireless mobile station.

11. The source base station as set forth in claim 7 wherein said handoff controller receives a first geographic location of said wireless mobile station at a first time and a second geographic location of said wireless mobile station at a second time and calculating the direction of motion of said wireless mobile station.

12. The source base station as set forth in claim 8 wherein said preferential ranking of said target base stations is selected by using the location information of said target base stations and using one of:
the geographic location of said wireless mobile station;
the velocity of said wireless mobile station; and
the direction of motion of said wireless mobile station.

13. In a wireless network for communicating with wireless mobile stations located in a coverage area of the wireless network, a method for selecting at least one target base station for a handoff of a wireless mobile station, said method comprising the steps of:
coupling a base station location database to a handoff controller within a source base station, said base station location database containing location information of a plurality of base stations;
receiving a message within said handoff controller that contains a base station location information;
placing said base station location information from said message in said base station location database;
receiving within said handoff controller one of: a geographic location of said wireless mobile station, a velocity of said wireless mobile station, and a direction of motion of said wireless mobile station;

selecting said at least one target base station for an inter-frequency hard handoff of said wireless mobile station using said location information of the at least one selected target base station contained in said base station location database and using one of: said geographic location of said wireless mobile station, said velocity of said wireless mobile station, and said direction of motion of said wireless mobile station, wherein the step of selecting said at least one target base station for said hard handoff of said wireless mobile station further uses at least one pilot signal strength measurement received by said wireless mobile station; and creating, from said base station location database, a preferential order of target base stations to which to hard hand off said wireless mobile station.

14. The method as set forth in claim 13 further comprising the steps of:

receiving the geographic location of said wireless mobile station within said handoff controller; and calculating in said handoff controller a distance of said wireless mobile station to the at least one selected target base station.

15. The method as set forth in claim 13 further comprising the steps of:

receiving within said handoff controller a first geographic location of said wireless mobile station at a first time;

receiving within said handoff controller a second geographic location of said wireless mobile station at a second time; and calculating in said handoff controller the velocity of said wireless mobile station.

16. The method as set forth in claim 13 further comprising the steps of:

receiving within said handoff controller a first geographic location of said wireless mobile station at a first time;

receiving within said handoff controller a second geographic location of said wireless mobile station at a second time; and calculating in said handoff controller the direction of motion of said wireless mobile station.

17. The method as set forth in claim 13 wherein said preferential ranking of said target base stations is selected by the steps of:

receiving within said handoff controller the location information of said target base stations; and selecting said preferential ranking of said target base stations using said location information of said target base stations and using one of: said geographic location of said wireless mobile station, said velocity of said wireless mobile station, and said direction of motion of said wireless mobile station.

* * * * *

UNITED STATES PATENT AND TRADEMARK OFFICE
CERTIFICATE OF CORRECTION

PATENT NO. : 7,512,403 B2 Page 1 of 1
APPLICATION NO. : 10/325649
DATED : March 31, 2009
INVENTOR(S) : Purva R. Rajkotia, Sanjay Kumar Kodali and Joseph R. Cleveland It is certified that error appears in the above-identified patent and that said Letters Patent is hereby corrected as shown below:

Column 10, line 10, delete "is".

Signed and Sealed this

Twelfth Day of January, 2010

David J. Kappos
*Director of the United States Patent and Trademark Office*